United States Patent
Chin et al.

(10) Patent No.: US 8,792,365 B2
(45) Date of Patent: Jul. 29, 2014

(54) SERVICE-BASED INTER-RADIO ACCESS TECHNOLOGY (INTER-RAT) HANDOVER

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 12/910,538

(22) Filed: Oct. 22, 2010

(65) Prior Publication Data

US 2011/0292821 A1    Dec. 1, 2011

Related U.S. Application Data

(60) Provisional application No. 61/348,582, filed on May 26, 2010.

(51) Int. Cl.
*H04L 12/26*    (2006.01)

(52) U.S. Cl.
USPC ............ 370/252; 370/328; 455/434; 455/436

(58) Field of Classification Search
USPC .......... 370/252, 328; 455/436, 434, 450, 552, 455/414, 422.1
See application file for complete search history.

(56) References Cited

U.S. PATENT DOCUMENTS

| 2003/0017842 | A1* | 1/2003 | Moles et al. ................... 455/552 |
| 2004/0147262 | A1* | 7/2004 | Lescuyer et al. ............... 455/434 |
| 2005/0239443 | A1* | 10/2005 | Watanabe et al. .......... 455/414.1 |
| 2006/0276127 | A1 | 12/2006 | Cruz et al. |
| 2008/0182615 | A1* | 7/2008 | Xue et al. .................... 455/552.1 |
| 2009/0088159 | A1* | 4/2009 | Wu et al. ........................ 455/436 |
| 2010/0014467 | A1 | 1/2010 | Wang et al. |
| 2011/0044253 | A1* | 2/2011 | Zisimopoulos ............... 370/328 |
| 2011/0237269 | A1* | 9/2011 | Chen ............................. 455/450 |
| 2012/0295606 | A1* | 11/2012 | Sebire et al. ............... 455/422.1 |

FOREIGN PATENT DOCUMENTS

| EP | 1257141 A1 | 11/2002 |
| EP | 2046078 A1 | 4/2009 |
| WO | WO2006048697 A1 | 5/2006 |
| WO | WO2006064391 A1 | 6/2006 |
| WO | WO2010005180 A2 | 1/2010 |

OTHER PUBLICATIONS

International Search Report and Written Opinion—PCT/US2011/038203—ISA/EPO—Jul. 29, 2011.
Taiwan Search Report—TW100118341—TIPO—Sep. 2, 2013.

* cited by examiner

*Primary Examiner* — Albert T Chou
(74) *Attorney, Agent, or Firm* — Kristine U. Ekwueme (57) ABSTRACT

In geographical areas with incomplete Time Division Synchronous Code Division Multiple Access (TD-SCDMA) coverage, it may be beneficial for a multimode User Equipment (UE) to handover to a GSM network, a WCDMA network, a CDMA 1x RTT network, or an LTE network. When multiple networks are available to the UE and a poor signal quality is detected in the TD-SCDMA network, one of the available networks may be selected for inter-RAT handover based on a service type of the active call on the UE. For example, when a circuit-switched call, such as a voice call, is in progress on the UE, an inter-RAT handover to a GSM network occurs. In another example, when a packet-switched call, such as a data call, is in progress on the UE, an inter-RAT handover to a WCDMA network occurs. Selecting a network for inter-RAT handover based on an active call service type improves the service provided to the UE.

45 Claims, 7 Drawing Sheets

SERVICE-BASED INTER-RADIO ACCESS TECHNOLOGY (INTER-RAT) HANDOVER

CROSS REFERENCE TO RELATED APPLICATION

This application claims the benefit of U.S. provisional patent application no. 61/348,582 filed May 26, 2010, in the names of CHIN et al., the disclosure of which is expressly incorporated herein by reference in its entirety.

BACKGROUND

1. Field

Aspects of the present disclosure relate, in general, to wireless communication systems, and more particularly, to multimode user equipment operating on dissimilar networks, such as Time Division—Synchronous Code Division Multiple Access (TD-SCDMA) networks, Code Division Multiple Access (CDMA) 1xRadio Transmission Technology (RTT) networks, Wideband Code Division Multiple Access (WCDMA), and Global System for Mobile Communication (GSM) networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method for inter-radio access technology (RAT) handover includes determining the quality of signals from multiple target RATs while a User Equipment (UE) is in a call with a source RAT. The method also includes transmitting an indication of the determined quality of the signals. The method further includes handing over the call to one of the target RATs based upon a service type of the call.

In another aspect, a computer program product for inter-radio access technology (RAT) handover includes a computer-readable medium having code to determine the quality of signals from multiple target RATs while a User Equipment (UE) is in a call with a source RAT. The medium also includes code to transmit an indication of the determined quality of the signals. The medium further includes code to hand over the call to one of the target RATs based upon a service type of the call.

In a further aspect, an apparatus for inter-radio access technology (RAT) handover includes a processor and a memory coupled to the processor. The processor is configured to determine the quality of signals from multiple target RATs while a User Equipment (UE) is in a call with a source RAT. The processor is also configured to transmit an indication of the determined quality of the signals. The processor is further configured to hand over the call to one of the target RATs based upon a service type of the call.

In yet another aspect, an apparatus for inter-radio access technology (RAT) handover includes means for determining the quality of signals from multiple target RATs while a User Equipment (UE) is in a call with a source RAT. The apparatus also includes means for transmitting an indication of the determined quality of the signals. The apparatus further includes means for handing over the call to one of the target RATs based upon a service type of the call.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
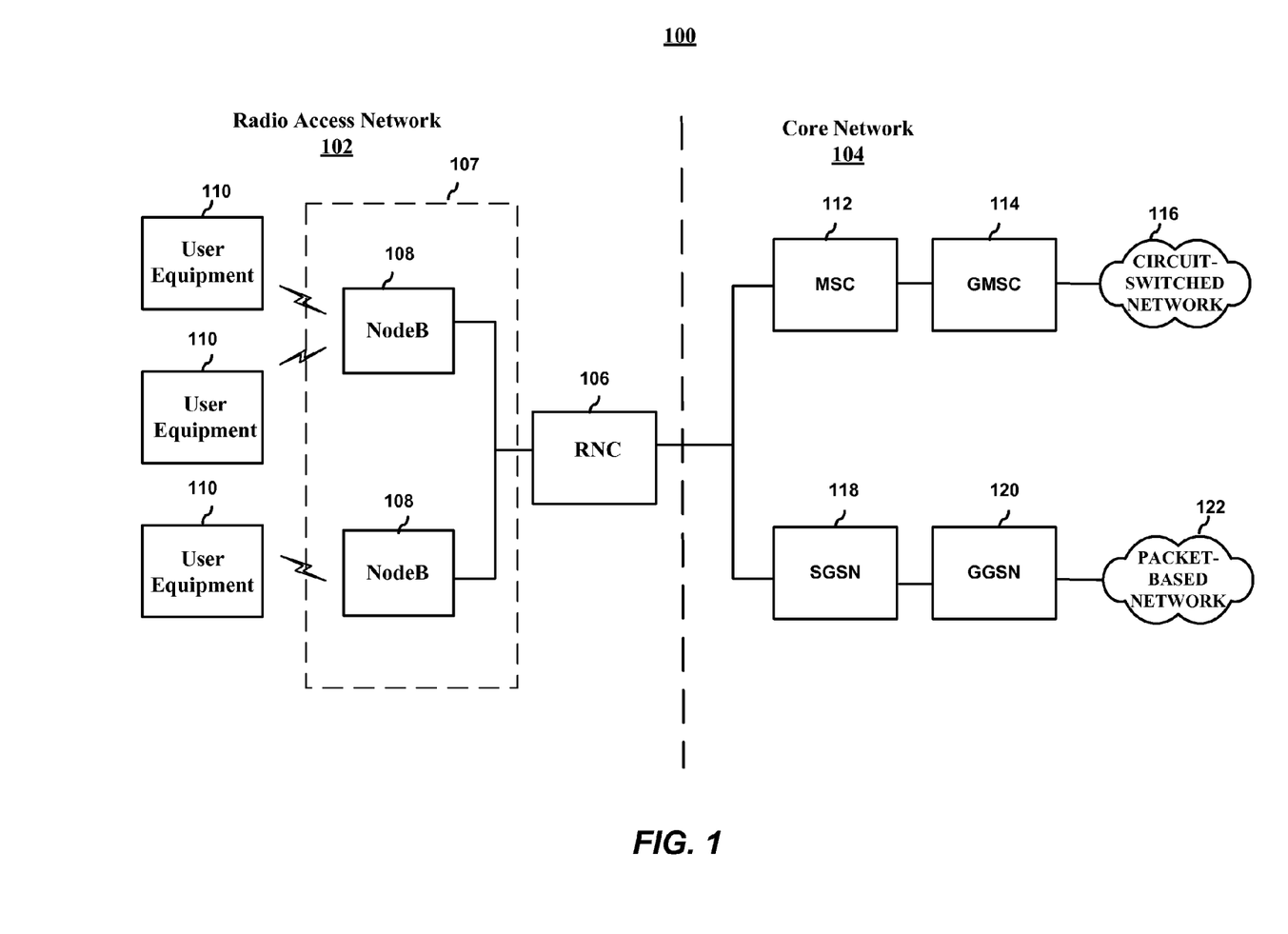
FIG. 1 is a block diagram illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (Radio Access Network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a Base Station (BS), a Base Transceiver Station (BTS), a radio base station, a radio transceiver, a transceiver function, a Basic Service Set (BSS), an Extended Service Set (ESS), an Access Point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a Session Initiation Protocol (SIP) phone, a laptop, a notebook, a netbook, a smartbook, a Personal Digital Assistant (PDA), a satellite radio, a Global Positioning System (GPS) device, a multimedia device, a video device, a digital audio player (e.g., MP3 player), a camera, a game console, or any other similar functioning device. The mobile apparatus is commonly referred to as User Equipment (UE) in UMTS applications, but may also be referred to by those skilled in the art as a Mobile Station (MS), a subscriber station, a mobile unit, a subscriber unit, a wireless unit, a remote unit, a mobile device, a wireless device, a wireless communications device, a remote device, a mobile subscriber station, an Access Terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The Downlink (DL) also called the forward link, refers to the communication link from a Node B to a UE, and the Uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a Mobile Switching Center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a Visitor Location Register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a Home Location Register (HLR) (not shown) containing subscriber data, such as the data reflecting the details of the services to which a particular user has subscribed. The HLR is also associated with an Authentication Center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a Serving GPRS Support Node (SGSN) 118 and a Gateway GPRS Support Node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a Time Division Duplexing (TDD), rather than a Frequency Division Duplexing (FDD) as used in many FDD mode UMTS/W-CDMA systems. TDD uses the same carrier frequency for both the Uplink (UL) and Downlink (DL) between a Node B 108 and a UE 110, but divides uplink and downlink transmissions into different time slots in the carrier.

Figure 2:
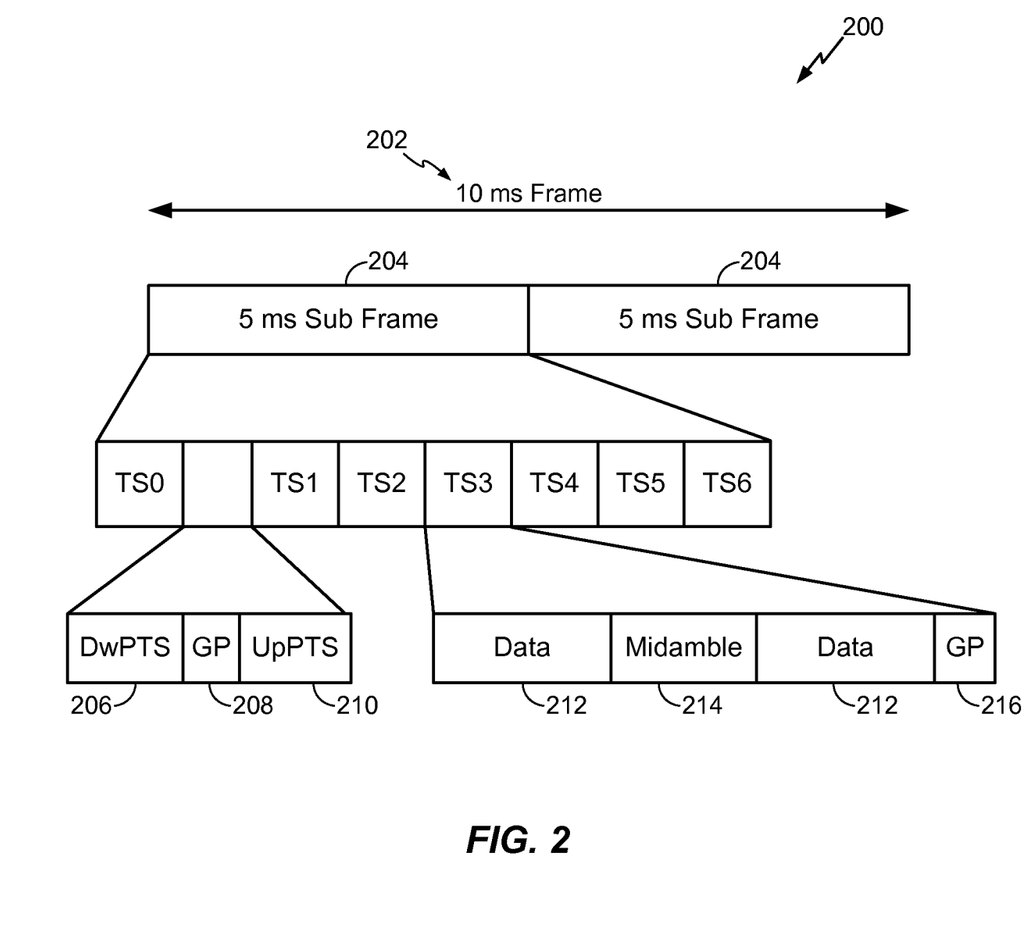
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A Downlink Pilot Time Slot (DwPTS) 206 (also known as the Downlink Pilot Channel (DwPCH)), a guard period (GP) 208, and an Uplink Pilot Time Slot (UpPTS) 210 (also known as the Uplink Pilot Channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a Guard Period (GP) 216. The midamble 214 may be used for features, such as channel estimation, while the GP 216 may be used to avoid inter-burst interference.

Figure 3:
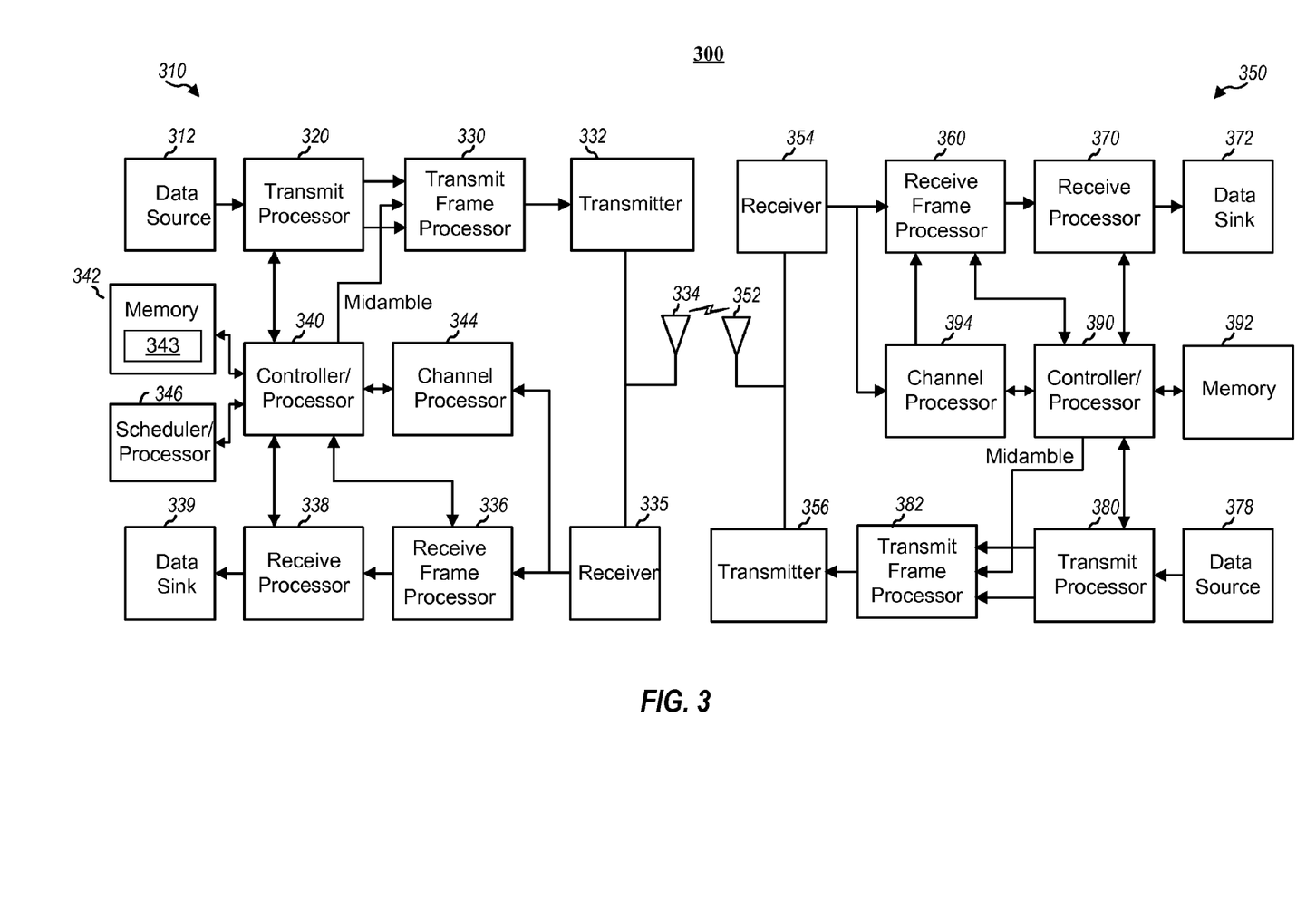
FIG. 3 is a block diagram of a Node B in communication with a user equipment in a radio access network.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide Cyclic Redundancy Check (CRC) codes for error detection, coding and interleaving to facilitate Forward Error Correction (FEC), mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM), and the like), spreading with Orthogonal Variable Spreading Factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an Acknowledgement (ACK) and/or Negative Acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an Acknowledgement (ACK) and/or Negative Acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 342 of the Node B 310 includes a handover module 343, which, when executed by the controller/processor 340, the handover module 343 configures the Node B to perform handover procedures from the aspect of scheduling and transmission of system messages to the UE 350 for implementing a handover from a source cell to a target cell. A scheduler/processor 346 at the Node B 310 may be used to allocate resources to the UEs and schedule downlink and/or uplink transmissions for the UEs not only for handovers, but for regular communications as well.

Figure 4:
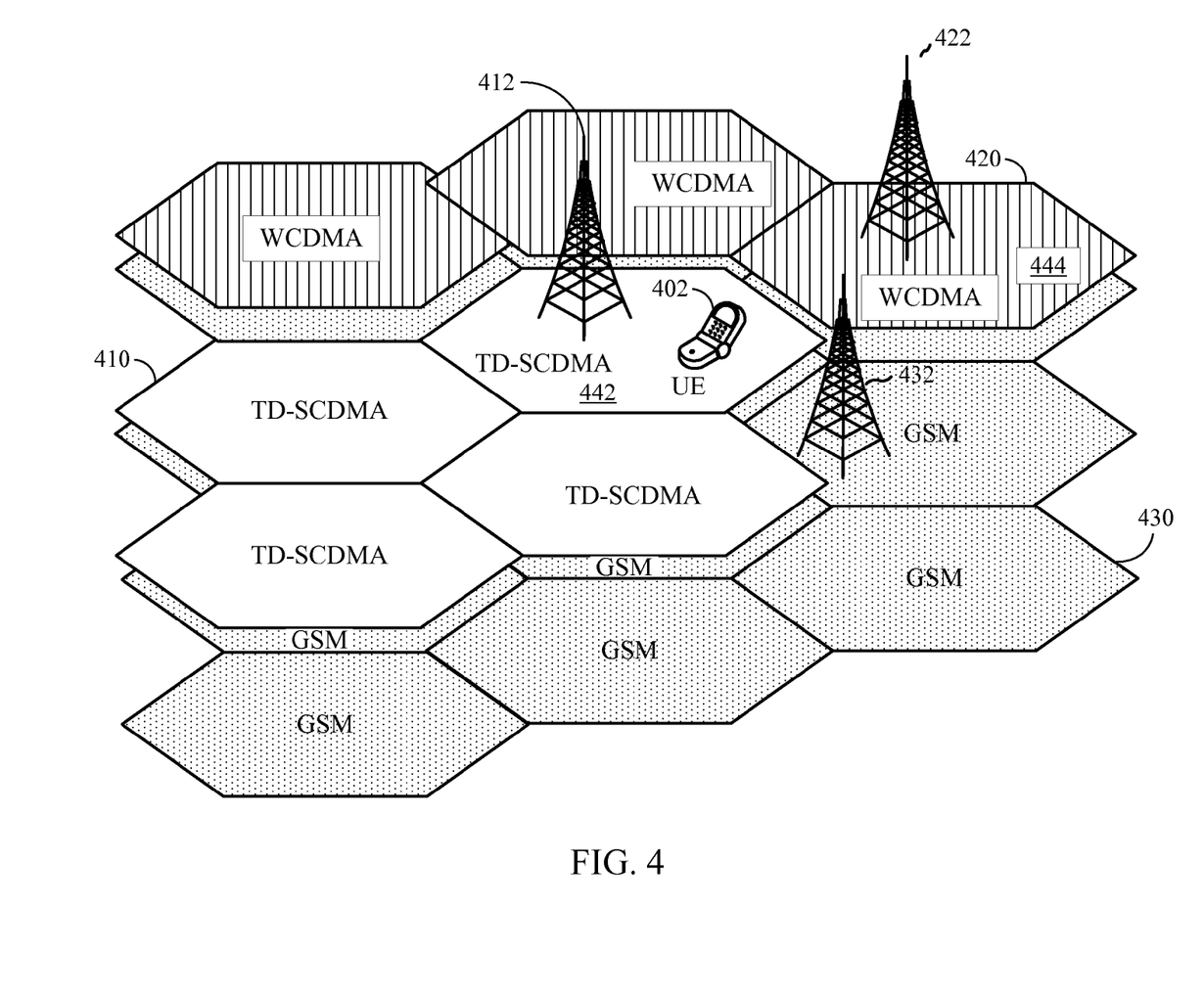
FIG. 4 illustrates a geographical area with coverage from three radio access technologies according to one aspect.

Deployment of a TD-SCDMA network may not provide complete geographic coverage in certain areas during the migration from 2G to 3G Radio Access Technologies (RATs). In areas where TD-SCDMA networks are deployed, other networks (such as WCDMA and Global System for Mobile Communications (GSM)) may also have a geographical presence. FIG. 4 illustrates a geographical area with coverage from three radio access technologies according to one aspect.

A first network coverage area 410 partially overlaps with a second network coverage area 420 and a third network coverage area 430. In one aspect, the first network coverage area 410 is a TD-SCDMA network, the second network coverage area 420 is a WCDMA network, and the third network coverage area 430 is a GSM network. Thus, a multimode UE 402 may benefit from being able to communicate with the TD- SCDMA network 410, the WCDMA network 420, and the GSM network 430. According to one aspect, the multimode UE 402 may communicate with a TD-SCDMA NB 412, a WCDMA BTS 422, and/or a GSM BTS 432. For example, the multimode UE 402 may have several Subscriber Identity Modules (SIMs): one SIM for WCDMA, one SIM for TD-SCDMA, and one SIM for GSM.

Generally, the different networks may have certain advantages and disadvantages. For example, the GSM network 430 provides matured circuit-switched services, which is advantageous for voice calls. That is, the GSM network 430 may offer more network coverage to allow un-disrupted voice call services in handovers. As another example, the WCDMA network 420 and the TD-SCDMA network 410 provide high performance packet-switched services, which is advantageous for data calls. That is, the WCDMA network 420 and the TD-SCDMA network 410 may offer higher data rates for data call services.

As the UE 402 moves from an old geographical area 442 to a new geographical area 444, the UE 402 may be in communication with a first type of network and handover to a different type of network. For example, the UE 402 may move from the TD-SCDMA network 410 in an old geographical area 442 to a new geographical area 444, which offers the GSM network 430 and the WCDMA network 420. When multiple networks are available in the new geographical area 444, the UE 402 selects one of the networks as the target RAT for inter-RAT handover of the UE 402.

Thus, there is a need for a multimode UE to select a network as a target RAT for inter-RAT handover when multiple networks are available.

According to one embodiment, a multimode UE may select a network as a target RAT for inter-RAT handover based, in part, on the service type currently in use by the UE. For example, when a UE is in communication using a TD-SCDMA network and the UE begins a handover, GSM and WCDMA networks may be available to the UE. Thus, the UE selects either the GSM or the WCDMA network for inter-RAT handover based, in part, on a service type currently in use by an active call on the UE.

When the UE is communicating in a circuit-switched (CS) call, such as a voice call, the UE may select the GSM network as the target RAT for an inter-RAT handover. The UE may select the GSM network for handover because the GSM network offers better un-disrupted service for circuit-switched calls. Alternatively, when the UE is communicating in a packet-switched (PS) call, such as a data call, the UE may select the WCDMA network as the target RAT for an inter-RAT handover. The UE may select the WCDMA network for handover because the WCDMA network offers better data rates for packet-switched calls.

Figure 5:
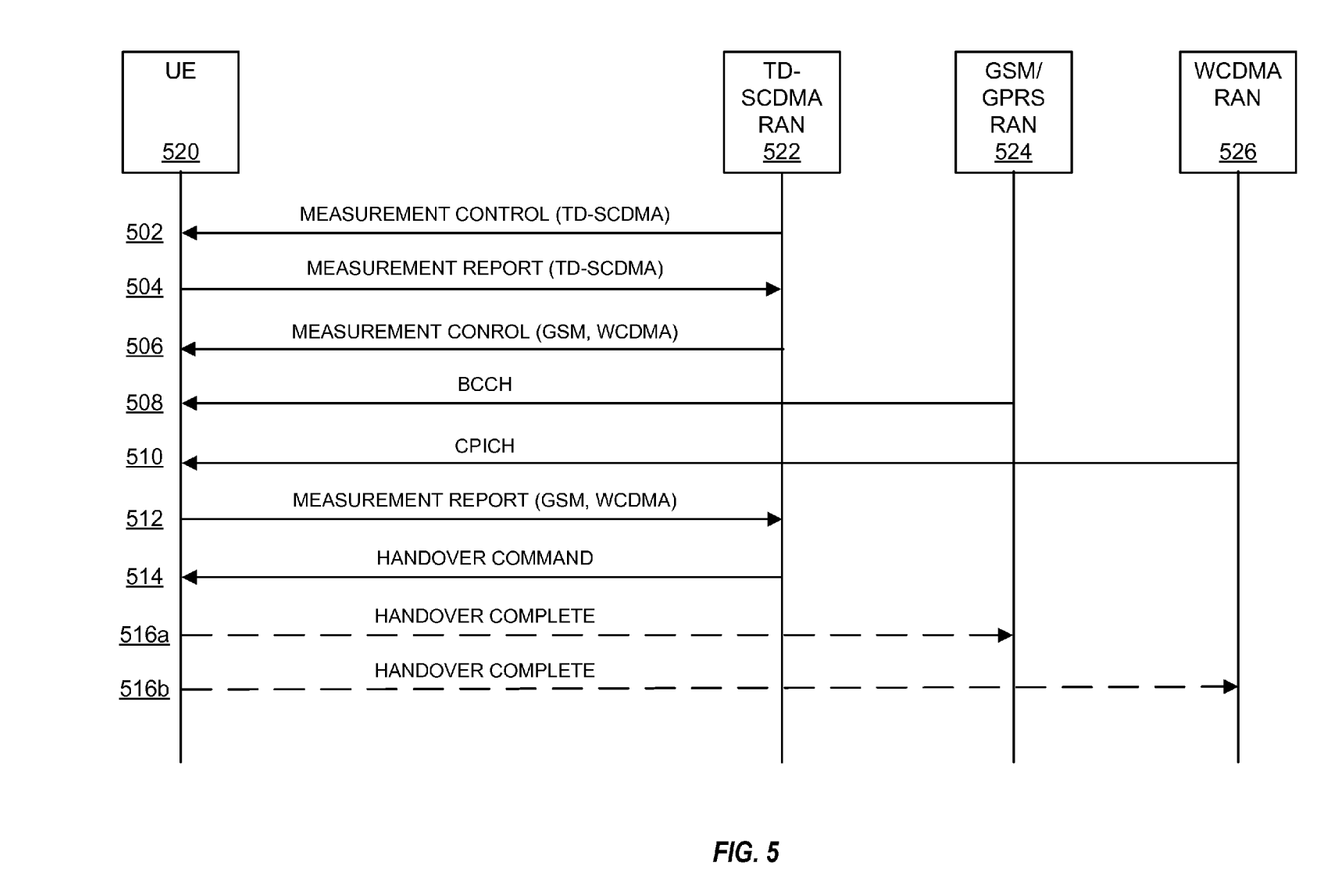
FIG. 5 is a call flow showing an exemplary inter-RAT handover of a multimode UE from a TD-SCDMA network to a GSM network or a WCDMA network according to one aspect.

FIG. 5 is a call flow showing an exemplary inter-RAT handover of a multimode UE from a TD-SCDMA network to a GSM network or a WCDMA network according to one aspect. Inter-RAT handover from a TD-SCDMA network 522 to a GSM network 524 or a WCDMA network 526 may occur when a multimode UE 520 receives weak signals from the serving and neighbor cells in the TD-SCDMA network 522. At time 502 the TD-SCDMA network 522 instructs the UE 520 to perform measurement of neighbor cells in the TD-SCDMA network 522 with a MEASUREMENT CONTROL message. At time 504 the UE 520 reports signal strength of neighbor cells in the TD-SCDMA network 522 to the TD-SCDMA network 522 using a MEASUREMENT REPORT message. If the reported signal strengths are determined by the TD-SCDMA network 522 to be below an acceptable threshold, the TD-SCDMA network 522 determines the UE 520 should perform an inter-RAT handover.

At time 506 the TD-SCDMA network 522 instructs the UE 520 to perform inter-RAT measurements. The TD-SCDMA network 522 may instruct the UE 520 with a MEASUREMENT CONTROL message. According to one aspect, the TD-SCDMA network 522 includes two or more indicators in the MEASUREMENT CONTROL message. The indicators identify networks for measurement to the UE 520. For example, the UE 520 may be instructed to measure the GSM network 524 and the WCDMA network 526. Alternatively, the UE 520 may be instructed to measure the GSM network 524 and a long term evolution (LTE) network (not shown) or a CDMA 1×RTT (Radio Transmission Technology) network (not shown). According to one aspect, the instruction may configure the UE 520 to use idle intervals defined by 3GPP Release 8 (e.g., a 10 millisecond interval every 40 or 80 milliseconds) to measure signal strength of the GSM network 524 and the WCDMA network 526. According to another aspect, the instruction may configure the UE 520 to measure the GSM network 524 and the WCDMA network 526 during unused TD-SCDMA time slots.

At time 508 the UE 520 measures quality of signals (e.g., signal strength) of the GSM network 524. According to one aspect, the UE 520 measures a Received Signal Strength Indicator (RSSI) of a Broadcast Control Channel (BCCH) of the GSM network 524. At time 510 the UE 520 measures quality of signals (e.g., signal strength) of the WCDMA network 526. According to one aspect, the UE 520 measures a Received Signal Code Power (RSCP) of a Common Pilot Channel (CPICH) of the WCDMA network 526.

At time 512 the UE 520 reports the measured quality of signals to the TD-SCDMA network 522. According to one aspect, the UE 520 reports the quality of signals to the TD-SCDMA network 522 with a MEASUREMENT REPORT message. The MEASUREMENT REPORT message may include an indication of two or more networks such as, for example, the GSM network 524 and the WCDMA network 526.

At time 514 the TD-SCDMA network 522 decides to handover the UE 520 to one of the GSM network 524 and the WCDMA network 526 based, in part, on a service type of an active call of the UE 520. If the TD-SCDMA network 522 determines the UE 520 is in an active circuit-switched call, such as a voice call, the TD-SCDMA network 522 may instruct the UE 520 to handover to the GSM network 524. According to one aspect, the TD-SCDMA network 522 only instructs the UE 520 to handover to the GSM network 524 when the quality of signal on the GSM network 524 exceeds an acceptable threshold. For example, the signal strength measured in the GSM network 524 should exceed a preferred level for the UE 520 to handover to the GSM network 524. At time 516a the UE 520 completes handover to the GSM network 524.

Alternatively, at time 514 if the TD-SCDMA network 522 determines the UE 520 is active in a packet-switched call, such as a data call, the TD-SCDMA network 522 may instruct the UE 520 to handover to the WCDMA network 526. According to one aspect, the TD-SCDMA network 522 only instructs the UE 520 to handover to the WCDMA network 526 when the quality of signal on the WCDMA network 526 exceeds an acceptable threshold. For example, the signal strength measured in the WCDMA network 526 should exceed a preferred level for the UE 520 to handover to the WCDMA network 526. At time 516b the UE 520 completes handover to the WCDMA network 526.

If only one of the GSM network 524 and the WCDMA network 526 are available or only one of the GSM network 524 and the WCDMA network 526 have a quality of signal exceeding an acceptable level, the TD-SCDMA network 522 may instruct the UE 520 to handover to the only available network. For example, if the UE 520 is on an active data call and the WCDMA network 526 has a quality of signal below an acceptable level, the TD-SCDMA network 522 may instruct the UE 520 to handover to the GSM network 524.

Figure 6:
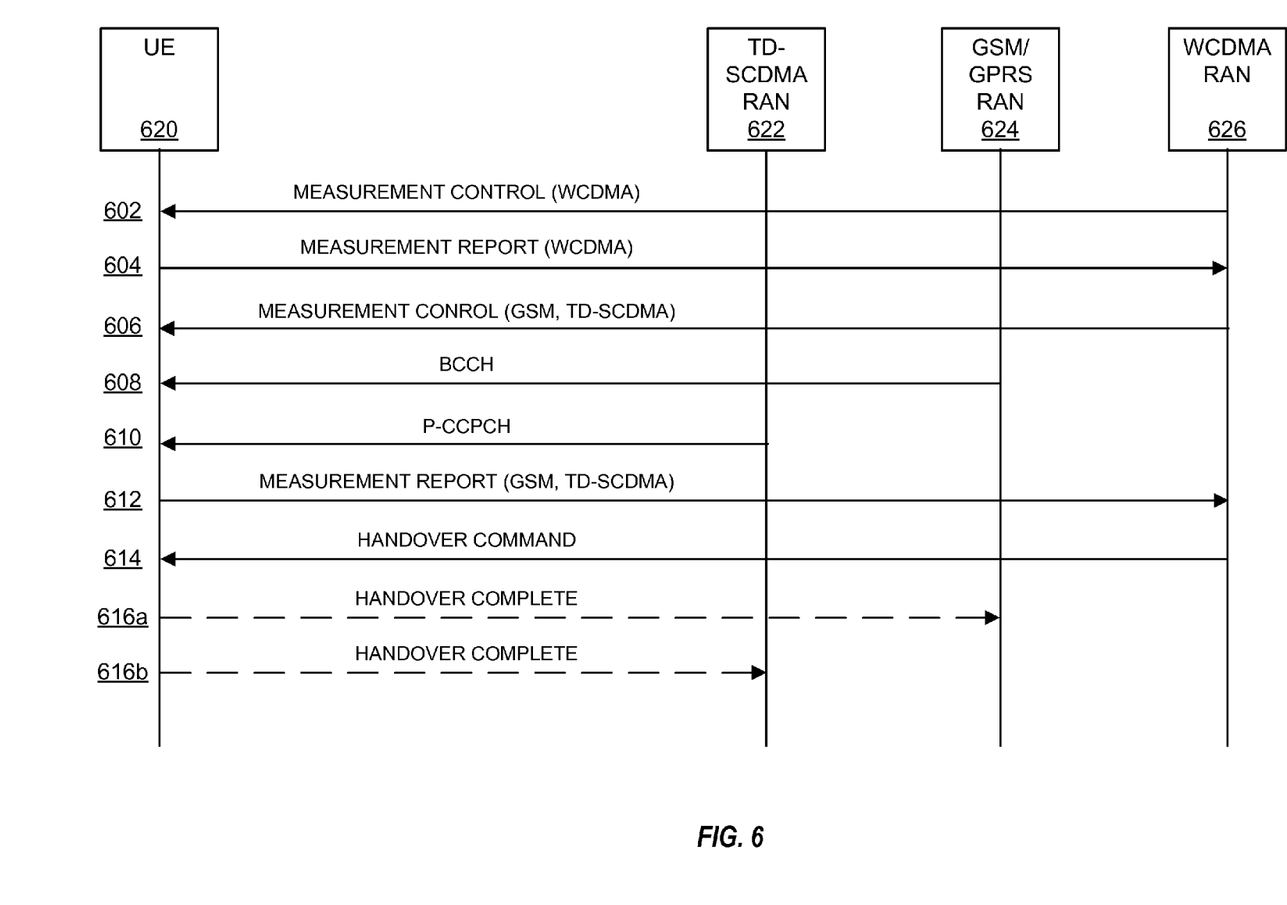
FIG. 6 is a call flow showing an exemplary inter-RAT handover of a multimode UE from a WCDMA network to a TD-SCDMA network or a GSM network according to one aspect.

According to another aspect, a UE is communicating with a WCDMA network when the WCDMA network serving and neighbor cells are determined to have a weak signal. FIG. 6 is a call flow showing an exemplary inter-RAT handover of a multimode UE from a WCDMA network to a TD-SCDMA network or a GSM network according to one aspect. At time 602 a WCDMA network 626 instructs a multimode UE 620 to measure a quality of signal of neighbor cells in the WCDMA network 626. At time 604 the UE 620 returns the measured quality of signal to the WCDMA network 626. If the WCDMA network 626 determines the quality of signal in the WCDMA network 626 is too low, the WCDMA network 626 may instruct the UE 620 to measure a GSM network 624 and a TD-SCDMA network 622. The inter-RAT measurements of the GSM network 624 and the TD-SCDMA network 622 may be used by the WCDMA network 626 to determine if an inter-RAT handover should be performed by the UE 620.

At time 606 the WCDMA network 626 instructs the UE 620 to measure the GSM network 624 and the TD-SCDMA network 622. At time 608 the UE 620 measures the RSSI of the BCCH of the GSM network 624, and at time 610 the UE 620 measures a RSCP of a Primary Common Control Physical Channel (P-CCPCH) of the TD-SCDMA network 622. At time 612 the UE 620 reports the measured quality of signal to the WCDMA network 626.

The WCDMA network 626 determines the active services on the UE 620 and uses the inter-RAT measurements of the GSM network 624 and the TD-SCDMA network 622 to determine if the UE 620 should perform an inter-RAT handover. If the WCDMA network 626 determines an inter-RAT handover should occur, the WCDMA network 626 determines the service type of the active call on the UE 620. If the active call of the UE 620 is a data call, the WCDMA network 626 instructs the UE 620 to handover to the TD-SCDMA network 622. If the active call of the UE 620 is a voice call, the WCDMA network 626 instructs the UE 620 to handover to the GSM network 624. According to one aspect, the WCDMA network 626 also determines if the quality of signal of the GSM network 624 and the TD-SCDMA network 622 are above an acceptable threshold.

In addition to the TD-SCDMA network 622 and the GSM network 624 more networks may be available to the UE 620. For example, an LTE network (not shown) or a CDMA 1× RTT (not shown) may be available for handover. If additional networks are available, the WCDMA network 626 may instruct the UE 620 at time 606 to perform measurements of the additional networks and determine at time 614 if the additional networks are preferable to the GSM network 624 and the TD-SCDMA network 622. If the GSM network 624 and a CDMA 1× RTT network is available, the WCDMA network 626 may handover the UE 620 to the CDMA 1× RTT network for packet-switched calls and handover the UE 620 to the GSM network 624 for circuit-switched calls. If the GSM network 624 and an LTE network is available, the WCDMA network 626 may handover the UE 620 to the LTE network for packet-switched calls and handover the UE 620 to the GSM network 624 for circuit-switched calls.

At time 614 the WCDMA network 626 instructs the UE 620 to handover to either the TD-SCDMA network 622 or the GSM network 624. At time 616a the UE 620 completes inter-RAT handover to the GSM network 624. Alternatively, at time 616b the UE 620 completes inter-RAT handover to the TD-SCDMA network.

Figure 7:
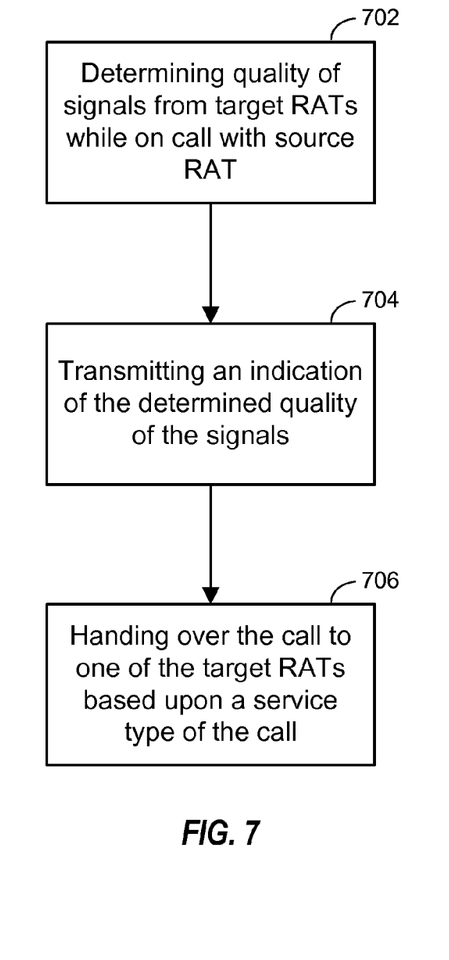
FIG. 7 is a flow chart illustrating an inter-radio access technology handover according to one aspect.

FIG. 7 is a flow chart illustrating an inter-radio access technology handover according to one aspect. A method for inter-radio access technology (RAT) handover begins at block 702 with a UE determining quality of signals from target RATs while a User Equipment (UE) is in a call with a source RAT. The method continues at block 704 with the UE transmitting an indication of the determined quality of the signals. The method further continues at block 706 with the UE handing over the call to one of the target RATs based upon a service type of the call.

Selecting a network for inter-RAT handover based, in part, on the service type of an active call improves performance of the UE and provides better service to the UE by selecting a network most suitable for the active call. For example, if the UE is engaged in data communications and several networks are available for inter-RAT handover, the UE hands over to the network most suitable for providing data service. Alternatively, if the UE is engaged in voice communications and several networks are available for inter-RAT handover, the UE hands over to the network most suitable for providing voice service. The UE may determine networks available before handover by receiving a message from the serving network indicating to the UE to perform inter-RAT measurement of at least two networks. Additionally, the serving network may select a network for handover only if the quality of signal from the network is above an acceptable level.

Several aspects of a telecommunications system has been presented with reference to TD-SCDMA, WCDMA and GSM systems. As those skilled in the art will readily appreciate, various aspects described throughout this disclosure may be extended to other telecommunication systems, network architectures and communication standards. By way of example, various aspects may be extended to other UMTS systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), Global System for Mobile Communications (GSM), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, Digital Signal Processor (DSP), a Field-Programmable Gate Array (FPGA), a Programmable Logic Device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., Compact Disc (CD), Digital Versatile Disc (DVD)), a smart card, a flash memory device (e.g., card, stick, key drive), Random Access Memory (RAM), Read Only Memory (ROM), Programmable ROM (PROM), Erasable PROM (EPROM), Electrically Erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for inter-radio access technology (inter-RAT) handover, comprising:
   determining a quality of a signal from at least one first target RAT for an intra-RAT handover, while a user equipment (UE) is currently served by a source RAT, when a quality of a signal from the source RAT is less than a threshold, the at least one first target RAT being of a same RAT type as the source RAT;
   transmitting, to the source RAT, the quality of the signal from the at least one first target RAT;
   receiving, from the source RAT, instructions to determine a quality of signals from a plurality of second target RATs when the quality of the signal from the at least one first target RAT is less than a threshold, the second target RATs being of a different RAT type than the source RAT;
   determining the quality of signals from the plurality of second target RATs while the UE is currently served by the source RAT;
   transmitting, to the source RAT, an indication of the determined quality of the signals for the plurality of second target RATs; and
   handing over the call to one of the plurality of second target RATs based upon a service type of the call.

2. The method of claim 1, wherein handing over the call comprises handing over the call when one of the plurality of second target RATs is determined to be available.

3. The method of claim 1, wherein handing over the call comprises:
   handing over the call to a first service type target RAT of the plurality of second target RATs when the call is a first service type, and,
   handing over the call to a second service type target RAT of the plurality of second target RATs when the call is a second service type.

4. The method of claim 3, wherein the first service type is a packet-switched service and the second service type is a circuit-switched service.

5. The method of claim 4, wherein the source RAT is a TD-SCDMA network, the first service type target RAT is a WCDMA network, and the second service type target RAT is a GSM network.

6. The method of claim 4, wherein the source RAT is a WCDMA network, the first service type target RAT is a TD-SCDMA network, and the second service type target RAT is a GSM network.

7. The method of claim 4, wherein the source RAT is a TD-SCDMA network, the first service type target RAT is a CDMA 1x RTT network, and the second service type target RAT is a GSM network.

8. The method of claim 4, wherein the source RAT is a TD-SCDMA network, the first service type target RAT is a LTE network, and the second service type target RAT is a GSM network.

9. The method of claim 1, wherein:
   handing over the call is further based on the quality of signal of the one of the plurality of second target RATs, and
   the one of the plurality of second target RATs for the handing over is indicated by the source RAT based on the source RAT's determination of the quality of signal and the service type of the call.

10. A computer program product for inter-radio access technology (inter-RAT) handover, comprising:
    a non-transitory computer-readable medium comprising:

code to determine a quality of a signal from at least one first target RAT for an intra-RAT handover, while a user equipment (UE) is currently served by a source RAT, when a quality of a signal from the source RAT is less than a threshold, the at least one first target RAT being of a same RAT type as the source RAT;

code to transmit, to the source RAT, the quality of the signal from the at least one first target RAT;

code to receive, from the source RAT, instructions to determine a quality of signals from a plurality of second target RATs when the quality of the signal from the at least one first target RAT is less than a threshold, the second target RATs being of a different RAT type than the source RAT;

code to determine the quality of signals from the plurality of second target RATs while the UE is currently served by the source RAT;

code to transmit, to the source RAT, an indication of the determined quality of the signals for the plurality of second target RATs; and code to hand over the call to one of the plurality of second target RATs based upon a service type of the call.

11. The computer program product of claim 10, wherein the code to hand over the call hands over the call when one of the plurality of second target RATs is determined to be available.

12. The computer program product of claim 10, wherein the code to hand over the call further comprises:

code to hand over the call to a first service type target RAT of the plurality of target RATs when the call is a first service type, and code to hand over the call to a second service type target RAT of the plurality of target RATs when the call is a second service type.

13. The computer program product of claim 12, wherein the first service type is a packet-switched service and the second service type is a circuit-switched service.

14. The computer program product of claim 13, wherein the source RAT is a TD-SCDMA network, the first service type target RAT is a WCDMA network, and the second service type target RAT is a GSM network.

15. The computer program product of claim 13, wherein the source RAT is a WCDMA network, the first service type target RAT is a TD-SCDMA network, and the second service type target RAT is a GSM network.

16. The computer program product of claim 13, wherein the source RAT is a TD-SCDMA network, the first service type target RAT is a CDMA 1x RTT network, and the second service type target RAT is a GSM network.

17. The computer program product of claim 13, wherein the source RAT is a TD-SCDMA network, the first service type target RAT is a LTE network, and the second service type target RAT is a GSM network.

18. An apparatus for inter-radio access technology (inter-RAT) handover, comprising:

at least one processor; and a memory coupled to the at least one processor, wherein the at least one processor is configured:

to determine a quality of a signal from at least one first target RAT for an intra-RAT handover, while a user equipment (UE) is currently served by a source RAT, when a quality of a signal from the source RAT is less than a threshold, the at least one first target RAT being of a same RAT type as the source RAT;

to transmit, to the source RAT, the quality of the signal from the at least one first target RAT;

to receive, from the source RAT, instructions to determine a quality of signals from a plurality of second target RATs when the quality of the signal from the at least one first target RAT is less than a threshold, the second target RATs being of a different RAT type than the source RAT;

to determine the quality of signals from the plurality of second target RATs while the UE is currently served by the source RAT;

to transmit, to the source RAT, an indication of the determined quality of the signals for the plurality of second target RATs; and to hand over the call to one of the plurality of second target RATs based upon a service type of the call.

19. The apparatus of claim 18, wherein the at least one processor is configured to hand over the call when one of the plurality of second target RATs is determined to be available.

20. The apparatus of claim 18, wherein the at least one processor is configured:

to hand over the call to a first service type target RAT of the plurality of second target RATs when the call is a first service type, and to hand over the call to a second service type target RAT of the plurality of second target RATs when the call is a second service type.

21. The apparatus of claim 20, wherein the first service type is a packet-switched service and the second service type is a circuit-switched service.

22. The apparatus of claim 21, wherein the source RAT is a TD-SCDMA network, the first service type target RAT is a WCDMA network, and the second service type target RAT is a GSM network.

23. The apparatus of claim 21, wherein the source RAT is a WCDMA network, the first service type target RAT is a TD-SCDMA network, and the second service type target RAT is a GSM network.

24. The apparatus of claim 21, wherein the source RAT is a TD-SCDMA network, the first service type target RAT is a CDMA 1x RTT network, and the second service type target RAT is a GSM network.

25. The apparatus of claim 21, wherein the source RAT is a TD-SCDMA network, the first service type target RAT is a LTE network, and the second service type target RAT is a GSM network.

26. An apparatus for inter-radio access technology (inter-RAT) handover, comprising:

means for determining a quality of a signal from at least one first target RAT for an intra-RAT handover, while a user equipment (UE) is currently served by a source RAT, when a quality of a signal from the source RAT is less than a threshold, the at least one first target RAT being of a same RAT type as the source RAT;

means for transmitting, to the source RAT, the quality of the signal from the at least one first target RAT;

means for receiving, from the source RAT, instructions to determine a quality of signals from a plurality of second target RATs when the quality of the signal from the at least one first target RAT is less than a threshold, the second target RATs being of a different RAT type than the source RAT;

means for determining the quality of signals from the plurality of second target RATs while the UE is currently served by the source RAT;

means for transmitting, to the source RAT, an indication of the determined quality of the signals for the plurality of second target RATs; and means for handing over the call to one of the plurality of second target RATs based upon a service type of the call.

27. The apparatus of claim 26, wherein the handing over means hands over the call when one of the plurality of second target RATs is determined to be available.

28. The apparatus of claim 26, wherein the handing over means further comprises:
means for handing over the call to a first service type target RAT of the plurality of second target RATs when the call is a first service type, and
means for handing over the call to a second service type target RAT of the plurality of second target RATs when the call is a second service type.

29. The apparatus of claim 28, wherein the first service type is a packet-switched service and the second service type is a circuit-switched service.

30. The apparatus of claim 29, wherein the source RAT is a TD-SCDMA network, the first service type target RAT is a WCDMA network, and the second service type target RAT is a GSM network.

31. The apparatus of claim 29, wherein the source RAT is a WCDMA network, the first service type target RAT is a TD-SCDMA network, and the second service type target RAT is a GSM network.

32. The apparatus of claim 29, wherein the source RAT is a TD-SCDMA network, the first service type target RAT is a CDMA 1x RTT network, and the second service type target RAT is a GSM network.

33. The apparatus of claim 29, wherein the source RAT is a TD-SCDMA network, the first service type target RAT is a LTE network, and the second service type target RAT is a GSM network.

34. A method for inter-radio access technology (inter-RAT) handover of a call, comprising:
requesting, from a user equipment (UE) by a source RAT that is currently serving the UE, a measurement of a quality of a signal of at least one first target RAT when a quality of a signal between the UE and the source RAT is less than a threshold, the at least one first target RAT being of a same RAT type as the source RAT;
receiving, at the source RAT an indication of the signal quality of the at least one first target RAT;
requesting, from the UE by the source RAT, a quality of signals of a plurality of second target RATs when the quality of the signal from the at least one first target RAT is less than a threshold, the second target RATs being of a different RAT type than the source RAT;
receiving, at the source RAT, an indication of the signal quality of the plurality of second RATs; and
instructing handover of a call from the source RAT to one of the plurality of second target RATs based at least in part on a service type of the call and the single message.

35. The method of claim 34, in which instructing the handover comprises instructing the handover of the call to one of the plurality of second target RATs when the signal quality of one of the plurality of second target RATs exceeds a threshold value.

36. The method of claim 34, in which instructing the handover comprises instructing the handover of the call to one of the plurality of second target RATs when one of the plurality of second target RATs corresponds to the service type of the call.

37. The method of claim 36, in which instructing the handover further comprises:
instructing the handover to a first service type RAT of the plurality of second target RATs when the service type of the call is a first service type; and
instructing the handover to a second service type RAT of the plurality second target RATs when the service type of the call is a second service type.

38. The method of claim 37, in which the first service type is a packet-switched service and the second service type is a circuit-switched service.

39. An apparatus for wireless communication, the apparatus comprising:
a memory unit; and
at least one processor coupled to the memory unit, the at least one processor being configured:
to request, from a user equipment (UE) by a source RAT that is currently serving the UE, a measurement of a quality of a signal of at least one first target RAT when a quality of a signal between the UE and the source RAT is less than a threshold, the at least one first target RAT being of a same RAT type as the source RAT;
to receive, at the source RAT, an indication of the signal quality of the at least one first target RAT;
to request, from the UE by the source RAT, a quality of signals of a plurality of second target RATs when the quality of the signal from the at least one first target RAT is less than a threshold, the second target RATs being of a different RAT type than the source RAT;
to receive, at the source RAT, an indication of the signal quality of the plurality of second RATs; and
to instruct handover of a call from the source RAT to one of the plurality of second target RATs based at least in part on a service type of the call and the single message.

40. The apparatus of claim 39, in which the at least one processor is further configured to instruct the handover of the call to one of the plurality of second target RATs when the signal quality of one of the plurality of second target RATs exceeds a threshold value.

41. The apparatus of claim 39, in which the at least one processor is further configured to instruct the handover of the call to one of the plurality of second target RATs when one of the plurality of second target RATs corresponds to the service type of the call.

42. The apparatus of claim 41, in which the at least one processor is further configured to:
instruct the handover to a first service type RAT of the plurality of second target RATs when the service type of the call is a first service type; and
instruct the handover to a second service type RAT of the plurality of second target RATs when the service type of the call is a second service type.

43. The apparatus of claim 42, in which the first service type is a packet-switched service and the second service type is a circuit-switched service.

44. An apparatus for wireless communication, the apparatus comprising:
means for requesting, from a user equipment (UE) by a source RAT that is currently serving the UE, a measurement of a quality of a signal of at least one first target RAT when a quality of a signal between the UE and the source RAT is less than a threshold, the at least one first target RAT being of a same RAT type as the source RAT;
means for receiving, at the source RAT, an indication of the signal quality of the at least one first target RAT;
means for requesting, from the UE by the source RAT, a quality of signals of a plurality of second target RATs when the quality of the signal from the at least one first target RAT is less than a threshold, the second target RATs being of a different RAT type than the source RAT;

means for receiving, at the source RAT, an indication of the signal quality of the plurality of second RATs; and means for instructing handover of a call from the source RAT to one of the plurality of second target RATs based at least in part on a service type of the call and the single message.

45. A computer program product for wireless communications, the computer program product comprising:

a non-transitory computer-readable medium having program code recorded thereon, the program code comprising:

program code to requesting, from a user equipment (UE) by a source RAT that is currently serving the UE, a measurement of a quality of a signal of at least one first target RAT when a quality of a signal between the UE and the source RAT is less than a threshold, the at least one first target RAT being of a same RAT type as the source RAT;

program code to receive, at the source RAT, an indication of the signal quality of the at least one first target RAT;

program code to request, from the UE by the source RAT, a quality of signals of a plurality of second target RATs when the quality of the signal from the at least one first target RAT is less than a threshold, the second target RATs being of a different RAT type than the source RAT;

program code to receive, at the source RAT, an indication of the signal quality of the plurality of second RATs; and program code to instruct handover of a call from the source RAT to one of the plurality of second target RATs based at least in part on a service type of the call and the single message.

* * * * *